Jan. 16, 1962     E. D. IDZI     3,017,165
APPARATUS FOR AERATING A LIQUID

Filed May 20, 1958     2 Sheets-Sheet 1

INVENTOR
Edward D. Idzi
BY Ogle R. Singleton
ATTORNEY

Jan. 16, 1962   E. D. IDZI   3,017,165
APPARATUS FOR AERATING A LIQUID
Filed May 20, 1958   2 Sheets-Sheet 2

INVENTOR.
Edward D. Idzi
BY Ogle R. Singleton
Attorney

United States Patent Office 3,017,165
Patented Jan. 16, 1962

3,017,165
APPARATUS FOR AERATING A LIQUID
Edward D. Idzi, 7109 Pulaski Highway, Baltimore 6, Md.
Filed May 20, 1958, Ser. No. 736,591
1 Claim. (Cl. 261—19)

My invention consists in a new and useful improvement in apparatus for aerating a liquid such as milk and cream, and is designed particularly for producing milk shakes and whipped cream. The particularly novel features of my improved apparatus are (1) a novel mixing chamber for controlled introduction of a jet of air under pressure into a stream of the liquid under pressure, (2) a conduit from said chamber, for the liquid and the air which is completely filled with a mass of novel pellets functioning to break up the mass of air-impelled liquid passing through the conduit, and (3) a novel faucet connected to the conduit and which is automatically closed by the air pressure in the conduit and, when manually opened, permits evacuation of the desired products from the apparatus.

While I have illustrated in the drawings and hereinafter fully described one specific embodiment of my invention, it is to be distinctly understood that I do not consider my invention to be limited to said embodiment, but refer for its scope to the claim appended hereto.

Figure 2:
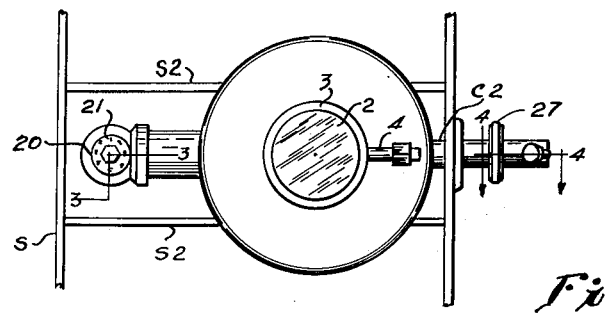
FIG. 2 is a top plan of my apparatus.

As shown in the drawings, my apparatus comprises (FIG. 1) a tank T, a mixing chamber M, a faucet F, and a conduit C connecting the chamber M with the faucet F. The tank T and chamber M may be suitably mounted, for refrigeration, in a casing S with a removable cover S–1, the conduit C extending outside of the casing S to suitably position the faucet F. Suitable brackets S–2 in the casing S support the tank T. The tank T has an inlet throat 1 in its top having a closure cap 2 which can be clamped in closing position, in a sealed joint, by a suitable clamping collar 3. An air inlet pipe 4 enters the tank T through the throat 1 and is connected by any suitable pipe 5 with a source of compressed air. The tank T has a discharge throat 6 disposed slightly below the top of tank T. A disc 7 is removably seated in the outer end of the throat 6 and has an orifice 7–a in which is fixed a pipe 8 having its upper end 8–a flush with the outer face of the disc 7. The pipe 8 extends through the throat 6, into the tank T, and downwardly, having its inner end 8–b spaced slightly from the bottom of the tank T. The disc 7 also has an orifice 7–b extending therethrough to form an air discharge port from the tank T.

The mixing chamber M has an inlet throat M–1 which is suitably mounted on the discharge throat 6 of the tank T (FIG. 2) as by matching flanges 6–a with a gasket 6–b therebetween (FIG. 3) and clamped by any suitable, removable clamping collar 9 (FIG. 1) to effect a sealed joint between the tank T and the mixing chamber M. The throat M–1 has a passage 10 co-axial with the upper end 8–a of the pipe 8. Suitably mounted in the meeting ends of the pipe 8 and the passage 10 there is a connector 11 having a flange 11–a disposed between the disc 7 and the face of throat M–1. The connector 11 has a reduced passage 12 therethrough connecting pipe 8 with passage 10, the purpose of which will presently be explained.

Figure 3:
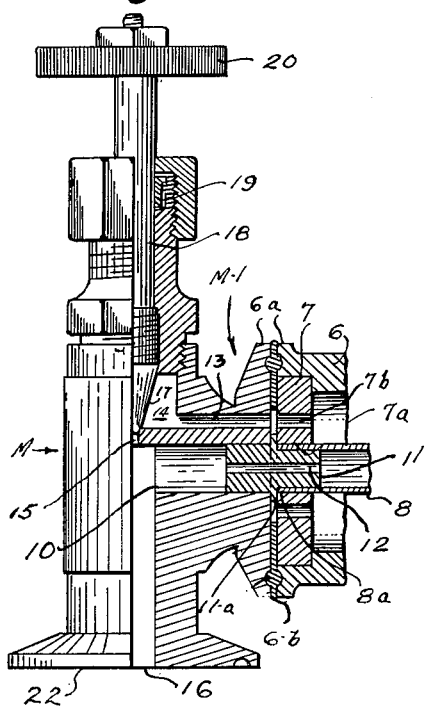
FIG. 3 is an enlarged vertical section on the line 3—3 of FIG. 2, in the direction of the arrows.

The throat M–1 has a passage 13 co-axial with the orifice 7–b of the disc 7, to provide an air passage to a chamber 14 having an orifice 15 into a chamber 16 with which the passage 10 connects. A needle valve 17 controls the opening of the orifice 15 and has a stem 18 threaded in the mixing chamber M and provided with a stuffing box 19 and an indicator disc 20 on its upper end with suitable figures 21 (FIG. 2).

Figure 6:
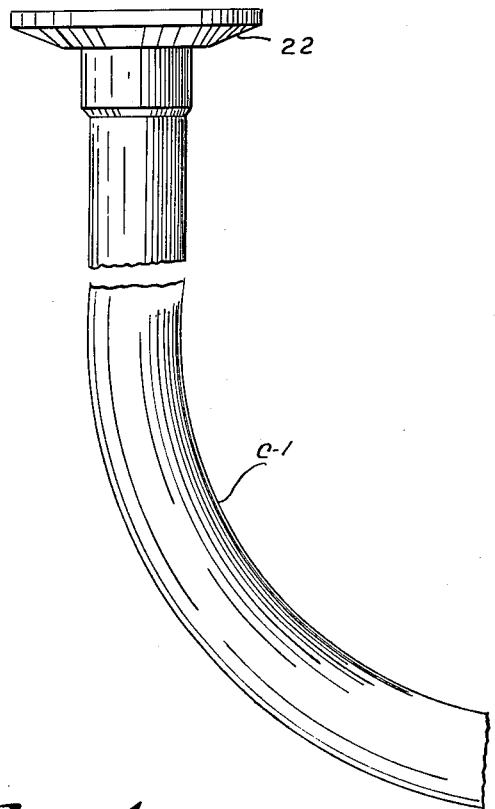
FIG. 6 is an enlarged side elevation of one of the sections of the conduit.

The conduit C connecting the mixing chamber M with the faucet F comprises sections C–1 and C–2. The section C–1 is removably connected to the mixing chamber M by matching flanges 22 (FIGS. 3 and 6) with a suitable gasket (not shown) therebetween and clamped by a suitable removable clamping collar 23 (FIG. 1) to effect a sealed joint between the mixing chamber M and the section C–1. The sections C–1 and C–2 are removably connected by suitable matching flanges (not shown) and clamped by a suitable removable clamping collar 24 (FIG. 1) to effect a sealed joint between the sections C–1 and C–2. The outer end of section C–2 is passed through an orifice S–3 in the cabinet S, a suitable bi-partite cover plate S–4 being provided to close the orifice S–3 about the section C–2. The section C–2 is removably connected to the faucet F by matching flanges 25 (FIG. 4) with a suitable gasket 26 therebetween and clamped by a suitable removable clamping collar 27 (FIG. 1) to effect a sealed joint between the section C–2 and the faucet F.

Figure 1:
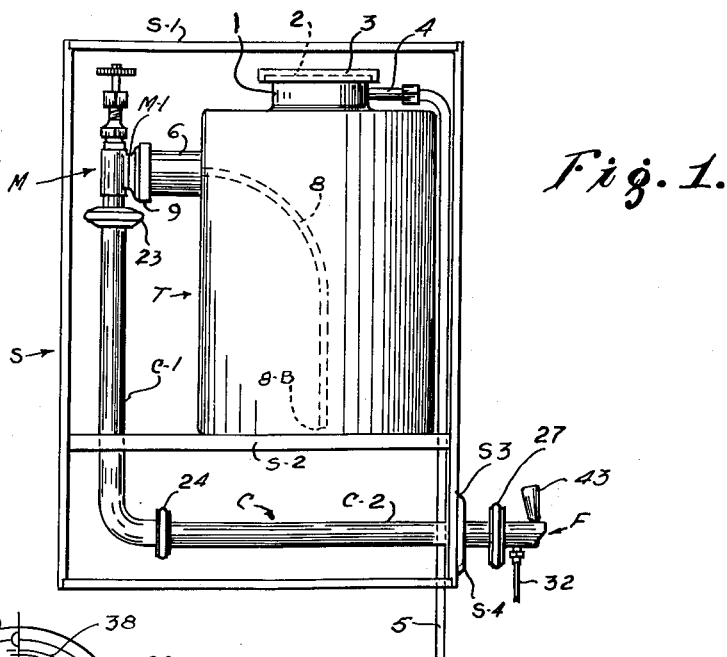
FIG. 1 is a side elevation of my apparatus.
Figure 5:
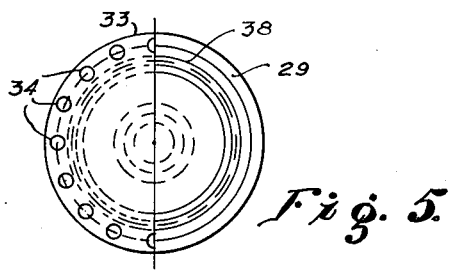
FIG. 5 is a vertical section on the line 5—5 of FIG. 4, in the direction of the arrows.
Figure 4:
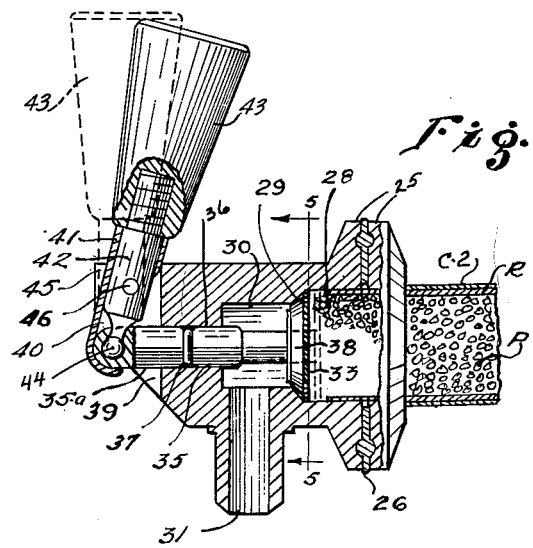
FIG. 4 is an enlarged vertical section on the line 4—4 of FIG. 2, in the direction of the arrows, a portion being broken away.

The faucet F (FIG. 4) has a chamber 28 communicating with the conduit C and having at its inner end a valve seat 29. An inner chamber 30 communicates with the chamber 28 through the valve seat 29 and has a discharge throat 31 provided with a suitable nozzle 32 (FIG. 1). A disc 33 (FIGS. 4 and 5) is slidable in the chamber 28 and has a plurality of circular orifices 34 therethrough disposed adjacent the periphery of the disc 33 (FIG. 5). The disc 33 is mounted on a valve stem 35 passing through the valve seat 29 and chamber 30 and slidable in a bore 36 in the faucet F with a sealing gasket 37. Mounted on the stem 35 there is a resilient valve member 38 co-acting with the valve seat 29 (FIG. 4). It will be noted (FIG. 4) that the valve member 38 is slightly spaced from the disc 33, and (FIG. 5) that the disc 33 and valve member 38 are so dimensioned and related that the periphery of the valve member 38 is aligned with the centers of the circular orifices 34.

The faucet F has, in its outer end, a slot 39 into which projects the outer end 35–a of the valve stem 35. This end 35–a is received into a slot 40 in a tubular rocker-arm 41. An operating lever 42, with a handle 43 threaded on its outer end, is received in the rocker-arm 41 and has its inner end connected to the end 35–a of the valve stem 35 by a ball-and-socket joint 44. The rocker-arm 41 and the lever 42 are jointly pivoted in the sides 45 of the slot 39 by a pintle pin 46. It will be noted (FIG. 4) that the bottom of the handle 43 bears upon the outer end of the rocker-arm 41 when the handle 43 is set-up on the lever 42 thereby exerting pressure on the pintle pin 46 to retain it in the sides 45.

As above-mentioned, the novel filling for the conduit C is one of the valuable features of my apparatus. As indicated in FIG. 4, this filling consists in a mass of pellets P contained in a casing R disposed in the conduit C. It is to be noted (FIG. 4) that the casing R projects from the section C–2 of the conduit C into the chamber 28 of the faucet F and abuts against the disc 33 when in open position. It is to be understood that the ends of the casing R are perforated for passage of the liquid under pressure through the casing R.

The pellets P are produced by my novel method which consists in submerging a mass of particles of expandable polystyrene in boiling water for period of five seconds, to cause said particles to swell to a spherical shape of 3/16" diameter, and subjecting said mass of particles to 300 pounds pressure to reduce the diameters of said particles to 1/8" and render them incompressible by the pressure of 125 pounds in my apparatus. When the particles are thus conditioned, they are packed in the casing R which is such as is used for casing sausages.

I use the casing R so that the pellets P can be withdrawn from the conduit C and disposed of after using the apparatus to avoid any contamination by germs caused by spoilage of the milk or cream which may remain in the apparatus. By making the conduit C of a disposable plastic, the casing R can be eliminated, the pellets P being packed in the conduit which is thrown away after use.

Having described the structural details of my apparatus, I will now describe its use and operation.

The tank T is charged with the liquid, such as milk or cream, to be aerated, the upper level of the liquid being below the orifice 7–b in the disc 7 for the air discharge from the tank T. The tank T is then sealed with its cap 2 and clamping collar 3. When air under 125 pounds pressure is admitted to the tank T through the inlet pipe 4, the pressure of the air on top of the mass of liquid causes the liquid to flow upwardly through the pipe 8 and the reduced passage 12 in the connector 11. The reduction of the diameter of the passage 12 causes a fine jet of liquid to be discharged through the passage 10 into the chamber 16. The air under pressure, above the mass of liquid, passes through the orifice 7–b in the disc 7, through the passage 13 into the chamber 14. Adjustment of the needle valve 17 by its stem 18 determines the flow of air from the chamber 14 through the orifice 15 into the chamber 16. It is obvious that the figures 21 on the disc 20 on the upper end of the stem 18 serve to indicate the setting of the needle valve 17. It will be noted that the air jet through the orifice 15 into the chamber 16 is normal to the liquid jet entering the chamber 16 from the passage 10, thereby atomizing the liquid in the chamber 16 which is caused to flow from the chamber 16 into the casing R in the conduit. The 125 pounds pressure imposed upon the liquid causes it to flow through the casing R in the conduit C. The casing R being packed with the pellets P, the liquid is caused to percolate through the interstices of the mass of imcompressible pellets P. This is the novel action which thoroughly breaks up the mass of air-impelled liquid passing through the conduit C, resulting in the desired aeration of the liquid.

I have found by experience that, when milk is treated by the above-described process, the product of my apparatus is the commercial "milk shake" and that, when cream is so treated, the product is the commercial "whipped cream."

The aerated liquid is forced out of the casing R against the disc 33 in the faucet F, causing the stem 35 on which the disc 33 is mounted to move the valve member 38 to seat on the valve seat 29, thereby cutting off communication between chambers 28 and 30 to close the faucet F, retaining the liquid in the apparatus.

When the rocker-arm 41 is rocked by the handle 43 on the operating lever 42, the valve stem 35 is moved (toward the right as shown in FIG. 4) to unseat the valve member 38, thereby opening the faucet F to allow the aerated liquid to flow through chamber 30, discharge throat 31 and nozzle 32 as the product of the apparatus.

It is to be particularly noted (FIGS. 4 and 5) that, by reason of the dimensions and relation of the orifices 34 in the disc 33, the valve seat 29 and the valve member 38, when the faucet F is closed, the liquid passes through one-half of the area of each orifice 34 onto the valve seat 29 about the periphery of the valve member 38, serving to seal the closed valve, when the valve member 38 is seated.

Having described my invention, what I claim is:

In an apparatus for aerating a liquid, the combination of a tank; a discharge throat mounted on said tank; a disc removably seated in the outer end of said throat and having a pair of orifices therethrough; a removable pipe extending from the lower end of said tank through said throat and having its upper end passed through one of said orifices and fixed in said disc; means adapted to so supply air under pressure to the upper part of said tank as to exert pressure on liquid in said tank to cause the liquid to flow through said pipe in one of said orifices and cause the air to flow from said tank through the other one of said orifices; and a mixing chamber removably mounted on said throat and having a passage connected with said upper end of said pipe for flow of the liquid to said mixing chamber, a second passage connected with said second orifice in said disc for flow of the air under pressure to said mixing chamber, a chamber with which said passage for the liquid connects, a second chamber with which the passage for the air connects, said second chamber having an orifice connected with said first chamber, and a needle valve rotatably mounted in said mixing chamber and adapted to control the opening of said orifice.

References Cited in the file of this patent

UNITED STATES PATENTS

| | | |
|---|---|---|
| 571,694 | Schneible | Nov. 17, 1896 |
| 1,202,670 | Carlson | Oct. 24, 1916 |
| 1,889,236 | Burmeister | Nov. 29, 1932 |
| 2,376,122 | Clifford | May 15, 1945 |
| 2,654,585 | Heesen | Oct. 6, 1953 |
| 2,779,062 | Stastny | Jan. 29, 1957 |
| 2,787,809 | Stastny | Apr. 9, 1957 |
| 2,864,714 | Dixon et al. | Dec. 16, 1958 |